United States Patent [19]

Merz et al.

[11] Patent Number: 4,577,013

[45] Date of Patent: Mar. 18, 1986

[54] IONICALLY MODIFIED CELLULOSE MATERIAL, ITS PREPARATION AND ITS USE

[75] Inventors: Jürg Merz, Biel-Benken; Walter Voser, Allschwil, both of Switzerland

[73] Assignee: Ciba-Geigy Corporation, Ardsley, N.Y.

[21] Appl. No.: 680,690

[22] Filed: Dec. 12, 1984

[30] Foreign Application Priority Data

Dec. 22, 1983 [CH] Switzerland .................. 6856/83

[51] Int. Cl.$^4$ ............... C08B 15/06; B01D 15/08
[52] U.S. Cl. ................... 536/43; 210/656; 210/660; 536/30
[58] Field of Search .......... 536/30, 43; 210/656, 210/660

[56] References Cited

U.S. PATENT DOCUMENTS

| | | | |
|---|---|---|---|
| 3,374,292 | 3/1968 | Zahir | 260/943 |
| 4,133,929 | 1/1979 | Bowes et al. | 428/407 |
| 4,178,438 | 12/1979 | Haase et al. | 210/502.1 |
| 4,263,146 | 4/1981 | Wegmuller et al. | 210/679 |
| 4,313,832 | 2/1982 | Shimizu et al. | 210/502.1 |
| 4,475,918 | 10/1984 | Kissling et al. | 528/256 |

FOREIGN PATENT DOCUMENTS 1570591 7/1980 United Kingdom .
1570592 7/1980 United Kingdom .

OTHER PUBLICATIONS

K. Dorfner: "Ionenaustauscher", pp. 3–24 (1970).
J. Chem. Tech. Biotechnol., vol. 32, pp. 109–118 (1982).
E. A. Peterson: "Cellulosic Ion Exchangers", p. 253, (1980).
J. Am. Chem. Soc., vol. 60, pp. 309–319 (1938).
Chem.-Ing.-Techn., vol. 32, pp. 349–354, (1960).
Chem.-Ing.-Techn., vol. 35, pp. 586–589, (1963).

*Primary Examiner*—Ronald W. Griffin
*Attorney, Agent, or Firm*—Edward McC. Roberts; Kevin T. Mansfield; Irving M. Fishman

[57] ABSTRACT

Ionically modified cellulose material in which the ionic moiety is linked to the cellulose moiety via the carbonyl group of the bridge member —CO—NH—CH$_2$—O— is suitable for being employed as the stationary phase in processes for separating mixtures of ionically charged components by chromatography, if the ionically modified cellulose material is obtainable from microcrystalline wood cellulose in the form of powder, as the starting material, the cellulose having a degree of polymerization of 490 to 550, and the cellulose powder consisting of particles having a specific BET surface area of 0.8 to 1.1 m$^2$/g and a degree of swelling in water at 20° C. of 4 to 6 ml/g.

4 Claims, No Drawings

IONICALLY MODIFIED CELLULOSE MATERIAL, ITS PREPARATION AND ITS USE

Cellulose materials which have been modified ionically by chemical means, for example cationic, amphoteric or anionic cellulose materials, and which are used in effluent purification, in particular for removing dyestuffs, are known from German Offenlegungsschriften Nos. 2,650,988, 2,727,755 and 2,925,689. The known ionically modified cellulose materials are prepared from cellulose in any desired embodiment, for example paper pulp, as the starting material.

It has now been found that ionically modified cellulose materials having advantageous and unexpected properties which make it possible to use them as the stationary phase in the chromatographic separation of mixtures of substances having an ionic charge, can be obtained if cellulose in the form of powders of the type indicated below is employed in the preparation of such cellulose materials.

The present invention relates, therefore, to an ionically modified cellulose material in which the ionic moiety is linked to the cellulose moiety via the grouping of the formula

$$-O-CH_2-NH-CO- \qquad (1)$$

the carbonyl group being attached to the ionic moiety of the material and the oxygen atom to the cellulose constituent of the material, which can be obtained from microcrystalline wood cellulose (i.e. chemical wood pulp) in the form of powder as the starting material, the cellulose having a degree of polymerisation of 490 to 550 and the cellulose powder consisting of particles having a specific BET surface area of 0.8 to 1.1 $m^2/g$ and a degree of swelling in water at 20° C. of 4 to 6 ml/g.

The present invention also relates to the process of preparing the ionically modified cellulose material, its use for separating mixtures of substances, and chromatographic separation processes in which this material is employed.

The most important characteristic of the cellulose in powder form from which the material according to the invention can be obtained is its degree of polymerisation. Ionically modified cellulose materials which can be obtained from a cellulose having a degree of polymerisation of, for example, 470 do not meet the requirements set for stationary phases in chromatographic separation processes, since they exhibit an inadequate flow behaviour in chromatographic separation columns. The degree of polymerisation is determined on the basis of the viscosity of the cellulose in a copper ethylenediamine solution by the method of the Scandinavian Pulp, Paper and Board Testing Committee SCAN-C 15:62, dated October 1962.

The specific BET surface area of the powder particles, as a further characteristic of the cellulose from which the material according to the invention can be obtained, is determined by means of nitrogen adsorption by the method of Brunauer, Emmett and Teller (cf. J. Am. Chem. Soc. volume 60, pages 309 to 319 (1938), and also Chemie-Ing. Techn. volume 32, pages 349 to 354 (1960) and volume 35, pages 586 to 589 (1963)). Cellulose powders in which the particles have a BET surface area of less than 0.75 or more than 1.15 $m^2/g$ result in ionically modified cellulose materials which, as the stationary phase in the chromatographic process, only lead to inadequate separation of mixtures of substances.

The degree of swelling quoted is a further characteristic of the cellulose from which the material according to the invention can be obtained. Cellulose material, obtained from cotton linters, in powder form which exhibits only a slight swelling in water even after 70 hours is not suitable for use as stationary phases for chromatographic purposes.

The cellulose powder as a starting material of the morphology described, which is chemically modified in a known manner to give the cellulose material according to the invention, is known per se and is commercially available under brand names, for example Cellulose S & S 123 ® and SERVA HBS ®.

The distinctive features indicated above of the cellulose powder employed as the starting material, in particular the degree of polymerisation, produce a good flow behaviour in the ionically modified cellulose material according to the invention as a statonary phase in chromatographic separation processes, insofar as fixed bed processes are used. This flow process is measured quantitatively as a flow rate having a preferred range of 600 to 800 $ml \times hr^{-1} \times cm^{-2}$. The flow rate thus constitutes a technically important property of the ionically modified cellulose material and is substantially independent of, for example, the geometry of the separation column, because the flow rate in ml/hour is relative to the surface area in $cm^2$ of the stationary phase in the separation column. If columns are employed for the chromatographic separation process, the back-pressure is about 0.01 to about 10 bar for a flow rate of about 20 to about 5,500 $ml \times hr^{-1} \times cm^{-2}$, in particular 0.1 to 5 bar for a flow rate of 500 to 800 $ml \times hr^{-1} \times cm^{-2}$.

As a rule, the ionically modified cellulose material according to the invention has a degree of substitution of about 0.1 to about 0.4, preferably 0.15 to 0.30 and especially 0.19 to 0.23, as is, in general, also the case for the ionically modified cellulose material described in the Offenlegungsschriften mentioned initially. The degree of substitution can be determined, for example, on the basis of the nitrogen content of the modified cellulose material.

The grouping of the formula I in the material according to the invention, which links the cellulose moiety via the oxygen to the ionic moiety via the carbonyl group, is described in the German Offenlegungsschriften mentioned initially, the ionic moieties (substituents) being anionic, preferably amphoteric and, in particular, cationic.

Such moieties, if they are cationic, contain basic substituents, for example quaternary guanidinium, immonium or, especially, ammonium groups. Cationic moieties which are of particular interest are those which preferably contain substituted ammonium groups, two such ammonium groups being, as a rule, present or, in particular, one such ammonium group being present.

Suitable N-substituents are aliphatic, cycloaliphatic, aromatic and araliphatic groups which can, if appropriate, form rings, preferably 5-membered and, in particular, 6-membered rings, together with the nitrogen atoms and, if appropriate, further hetero-atoms. Suitable N-substituents are, in particular, linear or branched lower alkyl radicals, such lower alkyl radicals being unsubstituted or substituted by hydroxyl, nitrile, halogen or lower alkoxy.

The basic radicals of preferred cationic moieties in the modified cellulose material according to the invention thus have, for example, the formula

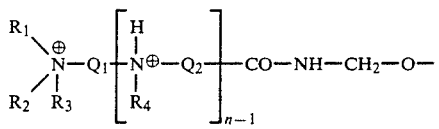
(2)

in which n is 1 or 2, $R_1$, $R_2$, $R_3$ and $R_4$ independently of one another are each hydrogen, linear or branched $C_1$–$C_4$-alkyl which is unsubstituted or substituted by hydroxyl, nitrile, halogen or $C_1$–$C_4$-alkoxy, cycloalkyl which is unsubstituted or substituted by $C_1$–$C_4$-alkyl, or benzyl or phenyl each of which is unsubstituted or substituted by nitro or halogen, or $R_1$ and $R_2$, together with the nitrogen atom linking them and, if appropriate, further hetero-atoms, are a 5-membered or 6-membered, heterocyclic ring or $R_3$ and $R_4$, together with the grouping

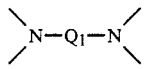

linking them and, if appropriate, further hetero-atoms, are also a 5-membered or 6-membered, heterocyclic ring and $Q_1$ and $Q_2$ independently of one another are each alkylene having 1 to 8 carbon atoms.

In a preferred embodiment of the cationic moieties according to formula (2), $R_3$ is hydrogen and the remaining N-substituents, if they are aromatic or cycloaliphatic, are preferably unsubstituted benzyl or cycloalkyl, or $R_1$ and $R_2$, together with the nitrogen atom linking them, preferably form a pyrrolidinium, piperidinium, morpholinium or piperazinium ring, or $R_2$ and $R_3$, together with the grouping

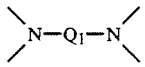

linking them, preferably form an imidazolidinium or piperazinium ring.

Accordingly, preferred cationic moieties have, for example, the formula

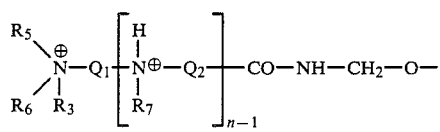
(3)

in which n is 1 or 2, $R_5$, $R_6$ and $R_7$ independently of one another are each hydrogen, $C_1$–$C_4$-alkyl, cycloalkyl or benzyl each of which is unsubstituted or substituted by hydroxyl, nitrile, halogen or $C_1$–$C_4$-alkoxy, or $R_5$ and $R_6$, together with the nitrogen atom linking them, are a pyrrolidinium, piperidinium, morpholinium or piperazinium ring, or $R_6$ and $R_7$, together with the grouping

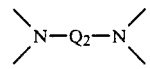

linking them, are also an imidazolidinium or piperazinium ring and $Q_1$ and $Q_2$ independently of one another are each alkylene having 1 to 8, in particular 2 or 3, carbon atoms.

In a further embodiment, which is also preferred, of the cationic moieties according to formula (4), branched or unbranched lower alkyl radicals which are unsubstituted or substituted by nitrile or, especially, hydroxl or chlorine as halogen, are employed as aliphatic N-substituents. Examples of suitable cycloaliphatic N-substituents are cyclopentyl and, in particular, cyclohexyl which are unsubstituted or substituted by lower alkyl. Benzyl or phenyl each of which is substituted by halogen, for example by chlorine, or especially unsubstituted benzyl or phenyl are preferred as araliphatic and aromatic N-substituents. Examples of preferred heterocyclic rings which can be formed together with the nitrogen atom of an ammonium group or with the two nitrogen atoms of two ammonium groups and, if appropriate, further hetero-atoms, in particular further nitrogen and/or oxygen atoms, are pyrrolidinium, piperidinium, morpholinium, imidazolinium or benzimidazolinium rings, especially piperazinium rings and, in particular, triazinium rings, and these are unsubstituted or substituted by halogen, for example chlorine. The ammonium group is preferably attached to the carbonyl group of the grouping of the formula (1) via an isopropylene group, especially an n-propylene group and preferably an ethylene group. If two ammonium groups are present, this also applies to the connecting link between these two ammonium groups.

Accordingly, further preferred, cationically modified cellulose materials according to the invention contain basic radicals of the formula

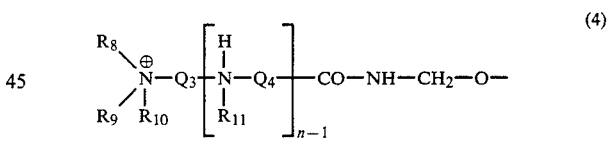
(4)

in which n is 1 or 2, $R_8$, $R_9$, $R_{10}$ and $R_{11}$ independently of one another are each hydrogen, alkyl, hydroxyalkyl, cyanoalkyl or chloroalkyl each of which has 1 to 4 carbon atoms, cyclopentyl or cyclohexyl each of which is unsubstituted or substituted by $C_1$–$C_4$-alkyl, unsubstituted benzyl or chlorobenzyl, or unsubstituted phenyl, nitrophenyl or chlorophenyl, or $R_8$ and $R_9$, together with the nitrogen atom linking them and, if appropriate, with an oxygen atom, form a pyrrolidinium, piperidinium or morpholinium ring or $R_{10}$ and $R_{11}$, together with the grouping

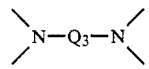

linking them and, if appropriate, further hetero-atoms, form an imidazolinium, benzimidazolinium, piperazinium, triazinium or monochlorotriazinium or dichlorotriazinium ring, and $Q_3$ and $Q_4$ independently of one another are each alkylene having 2 or 3 carbon atoms.

Cationically modified celluose materials which are of primary interest are those in which the basic radicals contain a single ammonium group which is attached at the carbonyl group of the grouping of the formula (1) via an ethyl group, and contain, as N-substituents, 2 unsubstituted lower alkyl radicals or a t-butyl radical which is substituted by hydroxyl.

Modified cellulose materials of this type contain, in particular, basic radicals of the formula

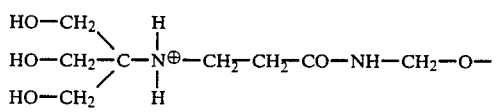

or

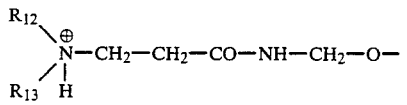

in which $R_{12}$ and $R_{13}$ are different from one another or, preferably, are identical and are each isopropyl, especially n-propyl or, in particular, ethyl or methyl.

If the ionically modified cellulose materials according to the invention contain amphoteric moieties which are attached at the carbonyl group of the grouping of the formula (1) such amphoteric moieties generally contain zwitterionic aminoacid groups, for example aminoacetic acid (glycine), iminodiacetic acid, methylaminoacetic acid (sarcosine), methylaminopropionic acid, iminodipropionic acid, imino-acetic/propionic acid, aspartic acid, ethanolaminoacetic acid, vinylbenzyliminodiacetic acid or ethylenediamine-N,N'-dipropionic acid groups.

These aminoacid groups, for example those of the type indicated above, are preferably attached to the grouping of the formula (1) at the carbonyl group via an alkyl-substituted, phenyl-substituted or unsubstituted alkylene or phenylene chain and, if appropriate, additionally via an oxygen or nitrogen atom or a secondary or alkyl-substituted tertiary amino group.

The zwitterionic radicals of preferred amphoteric moieties of the modified cellulose materials according to the invention thus have, for example, the formula

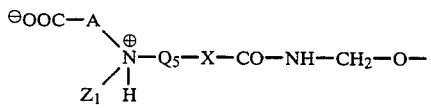

in which X is —O—, —S—,

or a direct bond, $R_{14}$ is hydrogen or alkyl having 1 to 4 carbon atoms, $Q_5$ is an unsubstituted $C_1$–$C_8$-alkylene or phenylene radical each of which is unsubstituted or substituted by $C_1$–$C_4$-alkyl or phenyl, $Z_1$ is —B—COO$^\ominus$, alkyl having 1 to 4 carbon atoms or hydrogen and A and B independently of one another are each a $C_1$–$C_8$-alkylene radical which is unsubstituted or substituted by $C_1$–$C_4$-alkyl, $C_1$–$C_4$-alkoxy or phenyl.

In formula (7), X is preferably a direct bond and $Z_1$ is preferably lower alkyl, preferably methyl or ethyl, or hydrogen. A suitable preferred definition of $Q_5$ is in particular, unsubstituted lower alkylene.

Amphoteric, modified cellulose materials which are of primary interest are, therefore, those which contain radicals of the formula

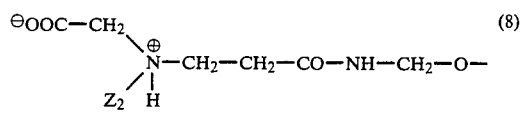

in which $Z_2$ denotes methyl or hydrogen.

If the modified cellulose materials according to the invention contain anionic moieties which are attached at the carbonyl group of the grouping of the formula (1), such anionic moieties generally contain a carboxyl radical or acid radicals of a polybasic, inorganic acid containing oxygen, for example the radical of a sulfuric acid ester or phosphoric acid ester, a phosphonic acid radical or a phosphoric acid racial, a phosphoric acid half-ester radical or a sulfonic acid radical. Such acid radicals are, as a rule, directly attached at the carbonyl group of the grouping of the formula (1), preferably via an unsubstituted or alkyl-substituted alkylene or phenylene chain.

The acid radicals of preferred anionic moieties of the modified cellulose materials according to the invention thus have, for example, the formula $$\ominus Y_1-Q_5-CO-NH-CH_2-O-, \quad (9)$$

in which $Y_1\ominus$ is carboxyl or the acid radical of a polybasic, inorganic acid containing oxygen, and $Q_5$ is as defined above, acid radicals of primary importance being those of the formula $$\ominus Y_1-Q_6-CO-NH-CH_2-O-, \quad (10)$$

in which $Q_6$ is $C_1$–$C_8$-alkylene which is unsubstituted or substituted by $C_1$–$C_4$-alkyl or phenyl, or, in particular, those of the formula $$Y_2\ominus-Q_7-CO-NH-CH_2-O-, \quad (11)$$

in which $Q_7$ is isopropylene, n-propylene or preferably ethylene or methylene and $Y_2\ominus$ is —COO$^\ominus$,

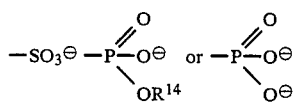

and $R_{14}$ is as defined above.

The procedure generally adopted in preparing the ionically modified cellulose material according to the invention is to react the cellulose powder of the type indicated, as the starting material, in a manner known per se with a compound containing an N-methylolamide group. Examples of N-methylol compounds employed here are those of the formula

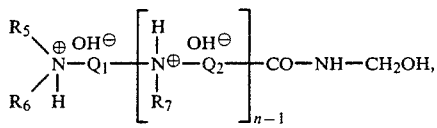  (12)

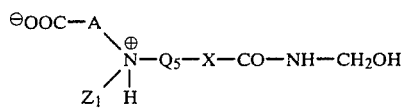  (13)

or $$H^{\oplus\ominus}Y_1—Q_5—CO—NH—CH_2OH \quad (14)$$

in which A, $Q_1$, $Q_2$, $Q_5$, $R_5$, $R_6$, $R_7$, X, $Y_1^\ominus$, $Z_1$ and n have the meanings indicated.

The compounds of the formula (12) are described in German Offenlegungsschriften Nos. 2,650,966 and 2,650,999, the compounds of the formula (13) are described in German Offenlegungsschrift No. 2,727,755 and the compounds of the formula (14) are described in German Offenlegungsschrift No. 2,925,689. The preparation of the compounds of the formulae (12), (13) and (14) is also described in the said German Offenlegungsschriften.

In a further embodiment for the preparation of the ionically modified cellulose material according to the invention, if $Q_2$ in formula (2), $Q_4$ in formula (4) and $Q_5$ in formula (7) are each ethylene and X in formula (7) is a direct bond, the cellulose powder of the type indicated is first reacted with methylolacrylamide as the methylol compound (prepared from acrylamide and formaldehyde or a formaldehyde donor, for example paraformaldehyde, hexamethylenetetramine or trioxane, at not more than 100° C., preferably 20° to 60° C., in an aqueous medium and, if appropriate, in the presence of a basic catalyst, for example sodium hydroxide, sodium methylate or magnesium oxide), after which the ionic moiety is introduced by addition of a cationic compound of the formula

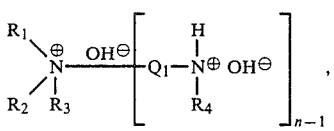  (16)

in which n, $R_1$, $R_2$, $R_3$, $R_4$ and $Q_1$ are as defined above, of an amphoteric compound of the formula

  (17)

in which A and $Z_1$ are as defined above, or of an anionic compound of the formula $$Y_1^\ominus H^\oplus \quad (18)$$

in which $Y_1^\ominus$ is as defined above, at the double bond of the intermediate product, which contains acyl-modified, non-ionic moieties of the formula $$—O—CH_2—NH—CO—CH=CH_2 \quad (15)$$

which are attached to the cellulose moiety.

Aminotriazine, aminodichlorotriazine, imidazole, benzimidazole, piperidine, chloroaniline, aniline and, in particular, diethylamine, diethanolamine and tris-(hydroxymethyl)-aminomethane may be mentioned as examples of preferred representatives of the formula (16), aminoacetic acid and sarcosine may be mentioned as examples of preferred representatives of the formula (17) and sodium pyrosulfite may be mentioned as an example of a preferred representative of the formula (18).

Preferably, the cellulose powder of the type indicated is kept at pH 3 to 6 and at 15° to 25° C. for about 20 to 40 minutes, with stirring, in an aqueous medium together with the methylol compound of one of the formulae (12), (13) or (14), the product is then dried at 70° to 80° C. and it is finally subjected to a heat treatment at 110° to 150° C. for about 1 to 2 hours. In a further preferred embodiment of the process of preparation, the cellulose powder is kept at pH 3 to 6 and at 15° to 50° C. for about 20 to 40 minutes, with stirring, in an aqueous medium together with methylolacrylamide as the methylol compound, preferably in the presence of a polymerisation inhibitor, for example hydroquinone, the product is then dried at 70° to 80° C. and it is then subjected to a heat treatment at 110° to 150° C. for 1 to 2 hours, the ionic moiety being introduced in a final stage by addition, in an aqueous medium at pH 7.0 to 12.5, preferably 11.0 to 12.0, and at 15° to 50° C. for about 4 to 6 hours, of a compound of one of the formulae (16), (17) or (18), to the double bond of the acrylic-modified intermediate product, and the ionically modified cellulose material finally being dried at 70° to 80° C. In both process variants it is advantageous to interpose, before the drying at 70° to 80° C., storage for at least 24 hours (so-called cold storage process) at 15° to 25° C. of the cellulose material which has been impregnated with the methylol compound.

The ionically modified cellulose material according to the invention is used for the purification of effluents, as described, for example in German Offenlegungsschrift No. 2,650,988, for ionically modified cellulose materials, and especially for separating mixtures of substances, as a rule in the form of an aqueous solution, which contain at least a proportion of ionic components. The chromatographic separation process, known per se, of such mixtures of substances is distinguished by the fact that the ionically modified cellulose material according to the invention, which has an ion capacity exchange, is employed as a stationary phase. In this process, the ionically modified cellulose material is employed, for example batchwise, in the so-called "batch space process". The so-called "continuous fluidised bed process" is also suitable. Preferably, however, the ionically modified cellulose material is used as the stationary phase of chromatographic separation columns (in the so-called "column process"). In the fluidised bed process the stationary phase is kept in continuous motion, in contrast with the fixed bed process, which is used, for example, in batch operation or in the column process. Within the meaning of the present invention, a chromatographic separation process is to be understood as meaning a reversible process in which, after separation, the separated substances can be recovered from the stationary phase, and the separating material can be recycled by regeneration into its original working form (cf. for example, pages 3 to 24 of the monograph "Ionenaustauscher" ("Ion Exchangers") by K. Dorfner, 3rd edition 1970, W. de Gruyter & Co.).

In particular, it is possible to separate into their components mixtures of organic substances of any composition, provided that at least one of the components in the mixtures of substances has a cationic, anionic or amphoteric charge. In this respect, anionically modified cellulose materials are especially suitable for the separation of cationic substances, and cationically modified cellulose materials are especially suitable for the separation of anionic substances. Amphoterically modified cellulose materials are suitable, however, for separating both cationic and anionic substances. Amphoteric substances can be separated by means of anionically, cationically or amphoterically modified cellulose materials. Examples of possible mixtures of substances which may be mentioned are, inter alia, technical mixtures of dyes, pharmaceuticals (enrichment or purification of fermentation liquors), plastics additives, textile assistants, wetting agents and dispersing agents, for example lignin derivatives. In particular, aminoacid mixtures, such as are present, for example, in preparations of crude cephalosporin C-sodium salts, can be purified by means of ion exchange chromatography using the ionically modified, preferably amphoterically modified and, especially, cationically modified, cellulose material according to the invention as the stationary phase. Thus, for example, W. Voser in the article "Isolation of Hydrophobic Fermentation Products by Adsorption Chromatography" in J. Chem. Techn. Biotechnology, volume 32, pages 109 to 118 (1982) describes an apparatus and a procedure for the chromatographic separation of cephalosporin C-sodium salts by means of macroporous ion exchangers, for example AMBERLIT XAD ®, which can also be used for the chromatographic separation of cephalosporin C-sodium salts using the ionically modified cellulose material according to the invention.

In particular, the chromatographic separation of ligninsulfonates, which are present in black liquors from the pulping of wood for paper manufacture (kraft process) or sulfite waste liquors for the pulping of wood (sulfite process) may be mentioned as a use of the ionically modified, in particular cationically modified, cellulose material according to the invention. This is because, inter alia, valuable dispersing agents and products based on polysaccharides can be obtained as a result of isolating the components of the ligninsulfonate mixtures. Ligninsulfonate mixtures of this type are available commercially under the brand names of, for example, ATTISOL I and II ®, MARASPERSE ®, DYNASPERSE ®, LIGNOSOL DIO ®, BORRESPERSE N ®, POLYFON O and H ® and REAX 80L, 81A, 82, 83A, 85A and 88B ®.

The chromatographic separation of lignin amines, ie. reaction products formed from lignin and diethylamine, which are commercially available (for example INDULIN ® brands), by means of the ionically modified, in particular anionically modified, cellulose materials according to the invention is also of particular interest. Lignin amines of this type are known, for example, as emulsifier additives for bitumen emulsions and are important for road construction.

Similarly, it is possible to separate chromatographically commercially available humic acids, for example those having molecular weights of 600–1000 made by FLUKA, using the ionically modified, in particular anionically modified, cellulose materials according to the invention as the stationary phase. The separation of humic acid has a practical application in the purification of drinking water.

The most important advantage of the ionically modified cellulose materials according to the invention lies in the fact that, by virtue of their good separating properties and their good flow behaviour, they can be employed satisfactorily as the stationary phase in chromatographic separation processes, it being possible to make use of the whole pH range from a pH of about 1 to a pH of about 13 by using alkaline as well as acid mobile phases.

In the instructions for preparation and examples below, the parts and percentages quoted relate to weight.

PREPARATION OF COMPOUNDS CONTAINING N-METHYLOLAMIDE GROUPS

Instructions A 264.6 parts (3.6 moles) of diethylamine are heated to 35° C. together with 0.9 part of 30% aqueous sodium hydroxide solution. A solution of 256 parts (3.6 moles) of acrylamide and 0.025 part of hydroquinone in 270 parts of water is added to the diethylamine solution in the course of 4 hours, the reaction mixture being kept at 40° C. by cooling. When the addition of acrylamide is complete, the reaction mixture is heated to 55° C., kept at this temperature for 15 hours and then cooled to 20° C., and the pH is adjusted to a value of 9.4 by means of 30 parts of 37% aqueous hydrochloric acid solution. 352 parts (4.34 moles) of 37% aqueous formaldehyde solution are then added to the reaction mixture. The reaction mixture is kept at 20° C. for 24 hours.

This gives 1,173.5 parts of a 50% aqueous, slightly viscous, brownish solution of the reaction product of the formula

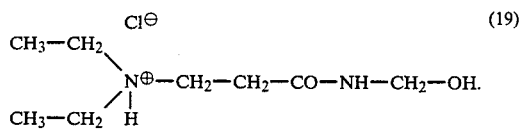

(19)

Instructions B

The procedure indicated in instructions A is repeated, except that 380 parts (3.6 moles) of diethanolamine are employed. This gives 1,289 parts of a 50% aqueous, slightly viscous, brownish solution of the reaction product of the formula

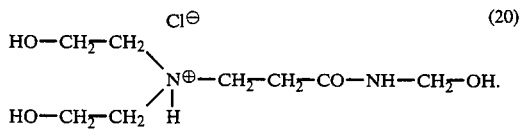

(20)

Instructions C 89 parts (1 mole) of sarcosine are dissolved at 20° C. in 60 parts of demineralised water, and the pH of the solution is adjusted to a value of 8.3 by means of 35 parts of 30% aqueous sodium hydroxide solution. 71 parts of acrylamide and 0.025 part of hydroquinone are dissolved in 100 parts of water at 30° C. The acrylamide solution is then added to the sarcosine solution in the course of 4 hours, the temperature of the reaction mixture being kept at 45° C. by heating. The reaction mixture is then heated to 55° C., kept at this temperature for 15 hours, with stirring, then treated with 162 parts (1 mole) of 37% aqueous formaldehyde solution, and allowed to stand for 16 hours at 55° C. This gives 517 parts of a 50% aqueous, slightly viscous, brownish solution of the reaction product of the formula

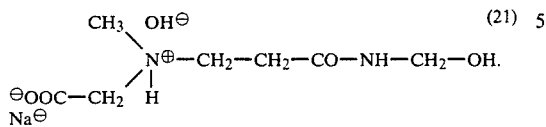

(21)

Instructions D 142 parts (2 moles) of acrylamide and 190 parts of sodium pyrosulfite are dissolved in 560 parts of water. The pH of the solution is 4.0. 42 parts of 30% aqueous sodium hydroxide solution are added to this solution. After the addition of the sodium hydroxide, the pH of the solution is 6.0. The reaction solution is then heated to 95° C., whereupon the pH of the solution rises to 13.0. The pH of the solution is adjusted to a value of 6.0 by adding in portions a total of 175 parts of aqueous 2N hydrochloric acid solution. The reaction solution is kept at 95° C., with stirring, for 75 minutes, at a constant pH of 6.0, and is then cooled to 40° C. 90 parts (3 moles) of paraformaldehyde are added at 40° C. to the reaction solution, and the pH of the latter is adjusted to a value of 9.5 by means of 30% aqueous sodium hydroxide solution. The reaction solution is kept at 40° C. and a pH of 9.5 for a further 16 hours, with stirring. This gives 447 parts of a clear, slightly viscous, aqueous solution containing 37% of the compound of the formula $$Na^{\ominus}SO_3^{\oplus}\text{---}CH_2\text{---}CH_2\text{---}CO\text{---}NH\text{---}CH_2OH \quad (22)$$

PREPARATION OF IONICALLY MODIFIED CELLULOSE MATERIALS

EXAMPLE 1:

600 parts of a cellulose powder composed of microcrystalline kraft cellulose, having a degree of polymerisation of 530, the powder consisting of particles having a BET surfact area of 0.88 m²/g and a degree of swelling in water at 20° C. of 5.6 ml/g, are mixed, at 20° C. for 30 minutes, with 3,000 parts of a 50% aqueous solution of the reaction product from instructions A, and the pH of the mixture is then adjusted to a value of 3.0 by means of 37% aqueous hydrochloric acid solution. After the cellulose suspension has been filtered, the impregnated cellulose powder is dried at 70° C. under reduced pressure. The condensation of the reaction product with the hydroxyl groups of the cellulose is then carried out at 120° C. for 5 hours. The cellulose powder treated in this way is washed with water until a sample of the wash water has a pH of 6 to 7, and is then dried at 70° C. under reduced pressure and comminuted in a mortar. This gives 520 parts of a yellowish-tinged, pulverulent, finely particulate, cationically modified cellulose material which has an ion exchange capacity of 0.83 milliequivalents/g, a pK value of 9.4 and very good flow properties and which contains modified cellulose units of the formula

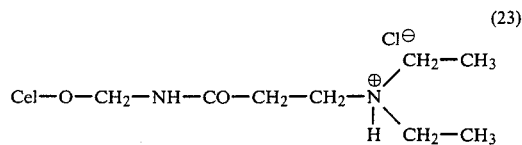

(23)

in which Cel is the cellulose radical.

The method of determining the ion exchange capacity is described, for example, on page 253 of the monograph "Cellulosic Ion Exchangers" by E. A. Peterson (1980 edition, Elsevier).

EXAMPLE 2

100 parts of the cellulose powder employed as the starting material in Example 1 are suspended in 500 parts of a 50% aqueous solution of the reaction product from instructions A, the pH of which has previously been adjusted to a value of 4.0 by means of 37% aqueous hydrochloric acid solution. This cellulose suspension is filtered, and the impregnated cellulose material is stored for 24 hours at 20° C. in the form of moist material on the filter, and is then dried at 80° C. under reduced pressure. The condensation reaction is then carried out at 150° C. for 45 minutes. Washing, drying and comminuting the material as indicated in Example 1 gives 122 parts of a yellowish-tinged, pulverulent, finely particulate, cationically modified cellulose material which has an ion exchange capacity of 0.95 milliequivalents/g, a pK value of 9.5 and very good flow properties and which contains modified cellulose units of the formula (23).

EXAMPLE 3

The procedure indicated in Example 1 is repeated, except that the starting material employed is a cellulose powder composed of microcrystalline kraft cellulose having a degree of polymerisation of 491, the powder consisting of particles having a BET surface area of 0.98 m²/g and a degree of swelling in water at 20° C. of 4.0 ml/g. 150 parts are obtained of a yellowish-tinged, pulverulent, finely particulate, cationically modified cellulose material which has an ion exchange capacity of 0.65 milliequivalents/g, a pK value of 9.4 and very good flow properties and which contains modified cellulose units of the formula (23).

EXAMPLE 4

The procedure indicated in Example 1 is repeated, except that 100 parts of the cellulose powder indicated as the starting material in Example 1 and 500 parts of a 50% aqueous solution of the reaction product from instructions B are employed, and the pH of the mixture (cellulose and solution of reaction product) is adjusted to a value of 3.8, but by means of aqueous, 0.5N hydrochloric acid solution. This gives 126 parts of a yellowish-tinged, pulverulent, finely particulate, cationically modified cellulose material which has an ion exchange capacity of 0.55 milliequivalents/g, a pK value of 8.3 and very good flow properties and which contains modified cellulose units of the formula

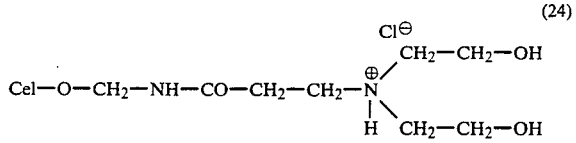

in which Cel is the cellulose radical.

EXAMPLE 5

100 parts of the cellulose powder employed as the starting material in Example 1 are suspended in 500 parts of a 50% aqueous solution of the reaction product from instructions B, the pH of which has previously been adjusted to a value of 3.5 by means of aqueous, 0.5N hydrochloric acid solution, and the mixture is allowed to stand at 30° C. for 30 minutes. The cellulose suspension is filtered, and the impregnated cellulose material is stored for 24 hours at 20° C. in the form of moist material on the filter and is then dried at 70° C. under reduced pressure. The condensation reaction is then carried out at 130° C. for 90 minutes. Washing, drying and comminuting the material as indicated in Example 1 gives 127 parts of a yellowish-tinged, pulverulent, finely particulate, cationically modified material which has an ion exchange capacity of 0.55 milliequivalents/g, a pK value of 8.3 and very good flow properties and which contains modified cellulose units of the formula (24).

EXAMPLE 6

15 parts of the cellulose powder employed as the starting material in Example 1 are mixed at 20° C. with 90 parts of a 40% aqueous solution of the reaction product according to instructions C, and the pH of the mixture is adjusted to a value of 3.0 by means of a 37% aqueous hydrochloric acid solution. The reaction mixture is then kept at 20° C., with stirring, for 30 minutes. After the cellulose suspension has been filtered, the impregnated cellulose material is dried at 70° C. under reduced pressure. The subsequent condensation reaction is carried out for 6 hours at 130° C. Washing, drying and comminuting the material as indicated in Example 1 gives 17 parts of a yellowish-tinged, pulverulent, finely particulate, amphoterically modified cellulose material which has an ion exchange capacity of 0.05 milliequivalents/g and very good flow properties and which contains modified cellulose units of the formula

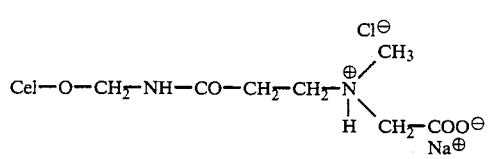

in which Cel is the cellulose radical.

EXAMPLE 7

Stage I 75 parts of the cellulose powder employed as the starting material in Example 1 are mixed with 340 parts of a 60% aqueous solution of monomethylolacrylamide in 200 parts of water. A suspension of the cellulose impregnated in this way is heated to 50° C. and its pH is adjusted to a value of 3.0 by means of an 85% aqueous solution of orthophosphoric acid. After the cellulose suspension has been filtered, the impregnated cellulose material is dried at 80° C. under reduced pressure. The condensation reaction is then carried out for 4 hours at 130° C. Washing, drying and comminuting the material as indicated in Example 1 gives 84 parts of a yellowish-tinged, pulverulent, acrylic-modified cellulose material which contains modified cellulose units of the formula

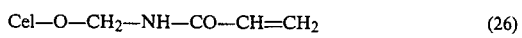

in which Cel is the cellulose radical.

Stage II 35 parts of the acrylic-modified cellulose material obtained in stage I indicated above are suspended in 100 parts of water, the suspension is heated to 50° C. and 25 parts of tris-(hydroxymethyl)-aminomethane are added in the course of 60 minutes at a pH of 11.0. After being filtered off, the treated cellulose material is dried at 70° C. under reduced pressure, washed with water until it is neutral, again dried under reduced pressure and comminuted in a mortar. This gives 54 parts of a yellowish-tinged, pulverulent, finely particulate, cationically modified cellulose material which has an ion exchange capacity of 0.21 milliequivalents/g, a pK value of 5.0 and very good flow properties and which contains modified cellulose units of the formula

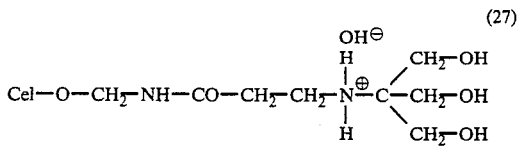

in which Cel is the cellulose radical.

EXAMPLE 8

Stage I 100 parts of the cellulose powder employed as the starting material in Example 1 are mixed with 500 parts of a 60% aqueous solution of monomethylolacrylamide and 2 parts of hydroquinone. The pH of this mixture is adjusted to a value of 3.5 by means of an aqueous 1N hydrochloric acid solution, and it is kept at 20° C., with gentle stirring, for 30 minutes. The suspension is then filtered. The impregnated cellulose material is stored for 24 hours at 20° C. while still moist and is then dried at 70° C. for 5 hours under reduced pressure. The condensation reaction is then carried out for 60 minutes at 130° C. This gives 115 parts of a yellowish-tinged, pulverulent, acrylic-modified cellulose material which contains modified cellulose units of the formula (26).

Stage II 15 parts of the acrylic-modified cellulose material obtained in the stage indicated above are suspended in 30 parts of demineralised water. 40 parts of a 50% aqueous solution of diethylamine are added in the course of 20 minutes to this suspension, the temperature of the reaction mixture rising to 30° C. of itself and a pH of 12 being set up. The suspension is then heated to 55° C., kept at this temperature for 5 hours and filtered. Washing, drying and comminuting the material as indicated in Example 1 gives 20 parts of a yellowish-tinged, pulverulent, finely particulate, cationically modified cellulose material which has an ion exchange capacity of 0.70 milliequivalents/g, a pK value of 8.3 and very good flow properties and which contains modified cellulose units of the formula (23).

EXAMPLE 9

15 parts of the acrylic-modified cellulose material obtained in stage I of Example 8 are suspended in 50 parts of a 50% aqueous solution of sarcosine. 45 parts of 30% aqueous sodium hydroxide solution are added to this suspension in the course of 45 minutes, the temperature of the reaction mixture rising of itself to 30° C. and a pH of 12.5 being set up in the reaction mixture. The suspension is then heated to 55° C., kept at this temperature for 5 hours and filtered. Washing, drying and comminuting the material as indicated in Example 1 gives 24 parts of a yellowish-tinged, pulverulent, finely particulate, amphoterically modified cellulose material which has an ion exchange capacity of 0.29 milliequivalents/g and very good flow properties and which contains modified cellulose units of the formula

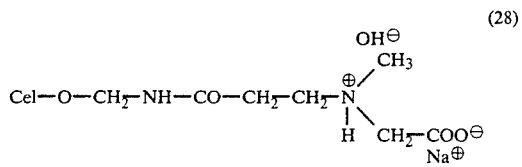

(28)

in which Cel is the cellulose radical.

EXAMPLE 10

15 parts of the acrylic-modified cellulose material obtained in stage I of Example 8 are suspended in 66.8 parts of a 50.6% aqueous solution of tris-(hydroxymethyl)-aminomethane. The pH of this suspension is adjusted to a value of 12.5 by means of 30% aqueous sodium hydroxide solution, and the suspension is heated to 55° C., kept at this temperature for 4 hours and filtered. Washing, drying and comminuting the material as indicated in Example 1 gives 24 parts of a yellowish-tinged, pulverulent, finely particulate, cationically modified cellulose material which has an ion exchange capacity of 0.15 milliequivalents/g, a pK value of 5 and very good flow properties and which contains modified cellulose units of the formula (27).

EXAMPLE 11

20 parts of the cellulose powder employed as the starting material in Example 1 are mixed with 1,135 parts of a 37% aqueous solution of the reaction product from instructions D. The resulting cellulose suspension is kept at 20° C., with stirring, for 30 minutes and is then filtered. The cellulose material thus impregnated is dried at 70° C. under reduced pressure. The subsequent condensation reaction is carried out at 130° C. for 75 minutes. Washing, drying and comminuting the material as indicated in Example 1 gives 185 parts of a yellowish, pulverulent, finely particulate, anionically modified cellulose material which has an ion exchange capacity of 2.7 milliequivalents/g and very good flow properties and which contains modified cellulose units of the formula

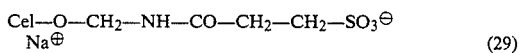

(29)

in which Cel is the cellulose radical.

EXAMPLE 12

20 parts of the cellulose powder employed as the starting material in Example 1 are mixed for 15 minutes, with stirring, with 100 parts of an aqueous solution containing 40% of 3-(dimethylphosphono)-N-hydroxymethylpropionamide. This compound is prepared from trimethyl phosphite, acrylamide and formaldehyde and is described, inter alia, in German Offenlegungsschrift No. 1,469,281 as a flameproofing agent for, for example, cotton fabrics. The pH of the cellulose suspension is adjusted to a value of 3.0 by means of 37% aqueous hydrochloric acid solution, and the suspension is kept at 20° C., with stirring, for 30 minutes. The cellulose powder thus impregnated is dried at 70° C. under reduced pressure. The condensation reaction is then carried out at 130° C. for 75 minutes. The cellulose powder is then suspended in 100 parts of an aqueous 30% sodium hydroxide solution, heated with stirring to the reflux temperature of approx. 98° C. and kept at this temperature for one hour. Washing (until the wash water has a neutral pH), drying and comminuting the material as indicated in Example 1 gives 19 parts of a white, pulverulent, finely particulate, anionically modified cellulose material which has an ion exchange capacity of 1.8 milliequivalents/g and very good flow properties and which contains modified cellulose units of the formula

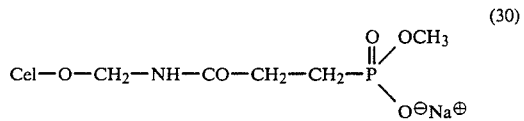

(30)

in which Cel is the cellulose radical.

In addition to the modified cellulose units of the formula (30), as the main constituent, the anionically modified cellulose material contains small amounts of cellulose units of the formula

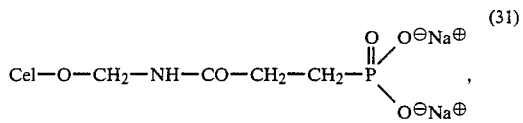

(31)

in which Cel is the cellulose radical.

EXAMPLES OF APPLICATIONS

EXAMPLE 13

A chromatography column having a diameter of 1.27 cm is filled with 7.0 g of the cationically modified cellulose material according to Example 5 (corresponding to 45 ml of cellulose material and a filled height of 33 cm). 250 ml of a 1.42% aqueous solution of crude cephalosporin C sodium salt are then percolated through the column at a flow rate of 50 ml×hr$^{-1}$×cm$^{-2}$ at 0.01 bar. The absorption value, determined at 425 nm in a 1 cm cell, of the strongly brownish-tinged solution before percolation is 1.65, whereas the percolate has an absorption value of only 0.935. The yield of percolated, purified cephalosporin C sodium salt, based on crude sodium salt, is 95.5%.

Similar results are achieved if, instead of the cellulose material according to Example 5, the cationically modified cellulose material according to one of Examples 1 to 4, 7 (stage II), 8 (stage II) or 10 or the amphoterically modified cellulose material according to one of Examples 6 or 9 is employed.

EXAMPLE 14

7 g of the cationically modified cellulose material according to Example 2 are suspended in 70 ml of distilled water and the suspension is kept at 20° C., with stirring, for 30 minutes. The pH of the suspension is 6.0. The suspension is then introduced into a glass chromatography column (diameter 1.27 cm, length 33 cm). The homogeneous bed of cellulose material, as the stationary phase, has a volume of 40 ml (filled height 31.5 cm). The cellulose material is first washed for one hour with distilled water at a flow rate of 700 ml$\times$hr$^{-1}\times$cm$^{-2}$ (back-pressure of the column 2 to 3 bar), and is then activated by means of an aqueous 0.1N hydrochloric acid solution and then washed with water until neutral. The column is then charged with 5 ml of a 0.5% aqueous solution of a commercially available ligninsulfonate mixture obtained from the pulping of wood, which has a pH of 10.0. All the components of the ligninsulfonate mixture are retained on the cellulose material at a flow rate of 100 ml$\times$hr$^{-1}\times$cm$^{-2}$.

The components of the ligninsulfonate mixture are then separated by chromatography from the cellulose material, as the stationary phase, using several eluants having an increasing concentration of electrolyte in the mobile phase. A fraction collector which separates the eluate into fractions of 4 ml each is used for this purpose, the flow rate of the liquid phase through the stationary phase being 100 ml$\times$hr$^{-1}\times$cm$^{-2}$. The absorption of each of the 4 ml fractions at 250 nm is determined, in order to make it possible to compare concentrations in respect of components of the ligninsulfonate mixture. The fractions which have no absorption are discarded. The fractions exhibiting absorption are collected. 5 components of the ligninsulfonate mixture are thus eluted in the course of the separation process. The course of the chromatographic separation of the ligninsulfonate mixture by means of the eluants used is indicated in Table I below:

TABLE I

| Eluants (aqueous solutions), pH | ml of eluate | Serial No. of the 4 ml fractions | Components eluted | | |
|---|---|---|---|---|---|
| | | | No. | Volume, ml | % of the mixture |
| NaCl 0.17 N pH 7.0 | 20 | 1–5 | — | — | — |
| | 20 | 6–10 | I | — | 8 |
| | 80 | 10–20 | — | — | — |
| NaCl N pH 7.0 | 100 | 25 | — | — | — |
| | 120 | 25–30 | II | 20 | 14 |
| | 160 | 40 | — | — | — |
| NaCl 2 N pH 7.0 | 200 | 50 | — | — | — |
| 10% Tris-(hydroxymethyl)-aminomethane buffer in distilled H$_2$O, pH 10.5 | 232 | 58 | — | — | — |
| | 272 | 59–68 | III | 40 | 21.5 |
| | 280 | 70 | — | — | — |
| 0.4% NH$_3$ solution pH 11.2 | 300 | 75 | — | — | — |
| | 340 | 76–85 | IV | 40 | 21.5 |
| | 380 | 90 | — | — | — |
| 7.5% NH$_3$ solution pH 12.3 | 380 | 95 | — | — | — |
| | 420 | 96–105 | V | 40 | 35 |
| | 440 | 110 | — | — | — |

In the IR spectrum, the weakly polar component I (8% of the original ligninsulfonate mixture) exhibits the characteristic —C=O band, the component II (14% of the mixture) exhibits the characteristic —COO$^\ominus$ band in addition to phenolic groups, and the component III (21.5% of the mixture) exhibits the characteristic polar SO$_3{}^\ominus$ and SO$_3$Na bands. On the basis of its chromatographic behaviour, corresponding to the higher pH values of the mobile phase, the component IV (21.5% of the mixture) is a polar ligninsulfonate fraction, and the component V (35% of the mixture) is a very polar, highly sulfonated lignin fraction.

When the separation of the ligninsulfonate mixture has been concluded, using a total of 440 ml of eluant, the cellulose material in the chromatography column is washed with approx. 100 ml of aqueous 0.1N hydrochloric acid solution until the eluate has a pH of 1 to 2. After the cellulose material has been washed with approx. 100 ml of water, until the eluate has a pH of 5.5, the cellulose material is available as a regenerated, stationary phase for further chromatographic separations.

Similar results are achieved if the cationically modified cellulose material according to one of Examples 1, 3, 4, 5 or 8 (stage II) is employed as the stationary phase of the chromatography column.

EXAMPLE 15

7 g of the anionically modified cellulose material according to Example 11 are suspended in 70 ml of distilled water, and the suspension is kept at 20° C., with stirring, for 30 minutes. The pH of the suspension is 8.0. The suspension is then introduced into a glass chromatography column (diameter 1.27 cm, length 33 cm). The homogeneous bed of cellulose material, as the stationary phase, has a volume of 39 ml (filled height 31 cm). The cellulose material is first washed for one hour with distilled water at a flow rate of 700 ml$\times$hr$^{-1}\times$cm$^{-2}$ (back-pressure of the column 1 to 2 bar). The column is then charged with 5 ml of a 0.5% aqueous solution of a commercially available lignin amine mixture having a pH of 8.7. All the components of the mixture of lignin amines are retained on the cellulose material at a flow rate of 100 ml$\times$hr$^{-1}\times$cm$^{-2}$.

The components of the mixture of lignin amines are then separated chromatographically from the cellulose material, as the stationary phase, using several eluants of increasing pH as the mobile phase. The procedure indicated in Example 14 is used for this purpose, employing a fraction collector and determining the absorption of the 4 ml fractions similarly at 250 nm. The course of the chromatographic separation of the mixture of lignin amines is indicated in Table II below. Sörensen phosphate buffers are employed for eluants having pH values of 6, 7 and 8, borax buffers are employed for pH values of 8.5, 9 and 10, and an aqueous ammonia solution is employed for the pH value of 12.3.

TABLE II

| pH of the eluant | ml of eluate | Fractions | |
|---|---|---|---|
| | | No. | % of the mixture |
| 6.0 | 100 | I | 8% |
| 7.0 | 200 | II | 7% |
| 8.0 | 300 | III | 19% |
| 8.5 | 400 | IV | 20% |
| 9.0 | 500 | V | 23% |
| 10.0 | 600 | VI | 15% |
| 12.3 | 700 | VII | 8% |

Fraction I is virtually non-polar. Fraction II has the lowest polarity and fraction 9 has the highest polarity, the polarity increasing continuously from fraction II to fraction IX.

After the separation of the mixture of lignin amines has been concluded, using a total of 720 ml of eluant, the cellulose material in the chromatography column is washed with approx. 100 ml of aqueous 0.1N sodium hydroxide solution, until the eluate has a pH of 12 to 13. After the cellulose material has been washed with approx. 100 ml of water, until the eluate has a pH of 8 to 8.5, the cellulose material is available as a regenerated, stationary phase for further chromatographic separations.

Similar results are achieved if the anionically modified cellulose material according to Example 12 is employed as the stationary phase of the chromatography column.

EXAMPLE 16

7 g of the cationically modified cellulose material according to Example 1 are suspended in 60 ml of distilled water, and the suspension is kept at 20° C., with stirring, for 30 minutes. The pH of the suspension is 6.0. The suspension is then introduced into a glass chromatography column (diameter 1.3 cm, length 30 cm). The homogeneous bed of cellulose material has a volume of 29 ml (filled height 22 cm). The resulting column has a flow rate of 720 ml $\times$ hr$^{-1}$ $\times$ cm$^{-2}$ at a back-pressure of 1.5 bar. The column is activated as indicated in Example 14 and is then washed.

The column is then charged with an aqueous solution containing 1% of a humic acid. The humic acid employed has a molecular weight of 600 to 1,000 and an ash content of 10 to 15% (supplier FLUKA, catalogue no. 53,680, 1984 edition). The humic acid solution is pumped through the column until the presence of humic acid is detected at the outlet from the column by means of a UV detector (determination carried out at 240 nm).

The separation of the humic acid is carried out by elution with an aqueous ammonia solution having a pH of 12.3. The elution process is continued until the UV detector indicates the absence of humic acid at the outlet from the column.

The loading capacity of the cationically modified cellulose material can be calculated on the basis of the content of humic acid before and after flow through the column. It is 50 mg of humic acid per g of separating material.

The column is regenerated by rewashing with distilled water until the pH of the wash water is 7 to 8, it is then washed with aqueous 0.1N hydrochloric acid solution until the pH of the eluate is 1.0, and is then washed again with 50 ml of distilled water.

After regeneration, the column is charged again, as indicated above, with the aqueous 1% solution of humic acid.

After one regeneration stage, the loading capacity is 40 mg of humic acid per g of separating material.

The regeneration stage and the separation of the humic acid solution are repeated several times.

The loading capacity is then, after two regeneration stages, 37 mg of humic acid per g of separating material.

EXAMPLE 17

The procedure indicated in Example 16 is repeated, except that the cationically modified cellulose material according to Example 4 is employed as the separating material.

The loading capacity is 36 mg of humic acid per g of separating material, and is 30 mg after one regeneration stage.

EXAMPLE 18

85 mg of the humic acid employed in Example 16 are dissolved in 500 ml of distilled water. 1 g of the cationically modified cellulose material according to Example 1 is added, with stirring, to the humic acid solution. The mixture is kept at 20° C. for 20 minutes, with stirring. After the mixture has been allowed to stand, the humic acid still present in the solution can be determined by measuring the UV absorption at 250 nm, and the amount of humic acid which has been removed from the solution by the cellulose material can be calculated.

This amount is 42 mg of humic acid per g of cellulose material.

EXAMPLE 19

The procedure indicated in Example 18 is repeated, except that the mixture (humic acid solution and cationically modified cellulose material) is kept at 40° C. for 20 minutes, with stirring. The amount of humic acid retained is 57 mg per g of cellulose material.

COMPARISON TEST I

The procedure indicated in Example 2 is repeated except that a cellulose powder consisting of particles having a BET surface area of 2.82 m$^2$/g and a degree of swelling in water of 9 ml/g, the degree of polymerisation of the cellulose being 329, is employed as the starting material instead of the cellulose powder according to Example 1. The cationically modified cellulose material thus prepared is employed, as indicated in Example 14, as the stationary phase of a chromatography column. The resulting chromatography column becomes clogged, the back-pressure applied rising to 300 bar. The chromatography column is therefore unusable.

COMPARISON TEST II

The procedure indicated in Example 2 is repeated, except that a cellulose powder consisting of particles having a BET surface area of 0.70 m$^2$/g and a degree of swelling in water of 7 ml/g, the degree of polymerisation of the cellulose being 148, is employed as the starting material instead of the cellulose powder according to Example 1. The cationically modified cellulose material thus prepared is employed, as indicated in Example 14, as the stationary phase of a chromatography column. The resulting chromatography column has a flow rate of only 300 ml $\times$ hr$^{-1}$ $\times$ cm$^{-2}$, the backpressure applied rising to 50 bar. The poor flow behaviour of the column causes the stationary phase to have poor separation properties. The column can, therefore, not be employed for chromatographic separation processes.

What is claimed is:

1. An ionically modified cellulose material in which each ionic moiety is linked to the cellulose moiety via a group of the formula

$$-O-CH_2-NH-CO-,$$

the carbonyl group being attached to the ionic moiety of the material and the oxygen atom being attached to the cellulose moiety of the material, which material is obtained from microcrystalline wood cellulose in the form of powder as the starting material, said cellulose powder having a degree of polymerisation of 490 to 550 and consisting of particles having a specific BET surface area of 0.8 to 1.1 m²/g and a degree of swelling in water at 20° C. of 4 to 6 ml/g.

2. A process for the preparation of the ionically modified cellulose material of claim 1 by reacting cellulose with a compound containing an N-methylolamide group, which comprises employing, as the starting material, microcrystalline wood cellulose in the form of powder, the cellulose having a degree of polymerisation of 490 to 550 and the cellulose powder consisting of spherical particles having a specific BET surface area of 0.8 to 1.1 m²/g and a degree of swelling in water at 20° C. of 4 to 6 ml/g.

3. In a method of separating a mixture of substances by contacting a fluid containing said mixture with a reversible absorbant, at least a fraction of the components of said mixture having an ionic charge, the improvement comprising contacting said mixture-containing fluid with the ionically modified cellulose material of claim 1 as the solid absorbent.

4. In a method of chromatographically separating a mixture of substances, at least a fraction of the components of said mixture having an ionic charge, by causing a mobile phase containing said mixture of components to flow through a stationary phase, the improvement comprising passing said mobile phase through the cellulose material of claim 1 as stationary phase.

* * * * *